(12) United States Patent
Zegdoun (10) Patent No.: US 9,646,412 B1
(45) Date of Patent: May 9, 2017

(54) PRE-SORTED ORDER INDEPENDENT TRANSPARENCY

(71) Applicant: Dassault Systemes SolidWorks Corporation, Waltham, MA (US)

(72) Inventor: Olivier Zegdoun, Methuen, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 53 days.

(21) Appl. No.: 14/335,365

(22) Filed: Jul. 18, 2014

Related U.S. Application Data (60) Provisional application No. 61/856,505, filed on Jul. 19, 2013.

(51) Int. Cl.
| | |
|---|---|
| *G06T 15/02* | (2011.01) |
| *G06T 15/50* | (2011.01) |
| *G06T 17/00* | (2006.01) |
| *G06T 15/00* | (2011.01) |

(52) U.S. Cl.
CPC .......... *G06T 15/503* (2013.01); *G06T 15/005* (2013.01); *G06T 17/00* (2013.01); *G06T 2200/08* (2013.01); *G06T 2210/62* (2013.01)

(58) Field of Classification Search
None
See application file for complete search history.

(56) References Cited

U.S. PATENT DOCUMENTS

| | | | | |
|---|---|---|---|---|
| 5,990,904 A * | 11/1999 | Griffin | .................. | G06T 11/001 345/631 |
| 6,204,859 B1 * | 3/2001 | Jouppi | .................. | G06T 11/001 345/422 |
| 6,750,869 B1 * | 6/2004 | Dawson | .................. | G06T 11/40 345/531 |
| 6,989,840 B1 | 1/2006 | Everitt et al. | | |
| 8,633,948 B2 | 1/2014 | Hayes | | |

(Continued)

OTHER PUBLICATIONS

Liu, Fang, et al. "Freepipe: a programmable parallel rendering architecture for efficient multi-fragment effects." Proceedings of the 2010 ACM SIGGRAPH symposium on Interactive 3D Graphics and Games. ACM, 2010.*

(Continued)

*Primary Examiner* — Daniel Hajnik
(74) *Attorney, Agent, or Firm* — Hamilton, Brook, Smith & Reynolds, P.C.

(57) ABSTRACT

In one embodiment, a computer-implemented method for rendering a three-dimensional computer-aided design model includes storing in a computer memory a subset of data fragments for a certain pixel location, receiving a next data fragment, and determining whether the next data fragment has a depth value indicating a position closer to a viewer than any one of the data fragments in the subset, in which case, the next data fragment replaces the data fragment in the subset having a depth value indicating a position farthest from the viewer. The subset is sorted according to respective depth values of each of the data fragments in the subset, and a blending process is performed to compute a pixel value representing a transparency characteristic of the three-dimensional computer-aided design model at the certain pixel location.

20 Claims, 6 Drawing Sheets
(4 of 6 Drawing Sheet(s) Filed in Color)

(56) References Cited

U.S. PATENT DOCUMENTS

2006/0132491 A1* 6/2006 Riach .................. G06T 15/005
 345/505

OTHER PUBLICATIONS

McGuire, M., et al. "Weighted Blended Order-Independent Transparency", Journal of Computer Graphics Techniques, ISSN 2331-7418, vol. 2, No. 2, 2013.
Maule, M., et al. "Memory-Efficient Order-Independent Transparency with Dynamic Fragment Buffer", Graphics, Patterns and Images (SIBGRAPI), 25th SIBGRAPI Conference, Aug. 22-25, 2012.
2014 SolidWorks—Transparency During Component Editing © 1995-2014 Dassault Systèmes [retrieved on Oct. 17, 2014] http://help.solidworks.com/2014/English/SolidWorks/sldworks/c_introduction_toplevel_topic.htm http://help.solidworks.com/2014/English/SolidWorks/sldworks/c_copyright_solidworks.htm http://help.solidworks.com/2014/english/solidWorks/sldworks/c_transparency_during_part_editing.htm.

* cited by examiner

PRE-SORTED ORDER INDEPENDENT TRANSPARENCY

RELATED APPLICATION(S)

This application claims the benefit of U.S. Provisional Application No. 61/856,505, filed on Jul. 19, 2013. The entire teachings of the above application(s) are incorporated herein by reference.

FIELD

This application relates to Computer-Aided Design (CAD), and more particularly, to high-quality real-time rendering.

BACKGROUND OF THE INVENTION

Computer-aided design (CAD) software allows a user to construct and manipulate complex three-dimensional (3D) models. A number of different modeling techniques can be used to create a 3D model. These techniques include solid modeling, wire-frame modeling, and surface modeling. Solid modeling techniques provide for topological 3D models, where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to the topological faces bounded by the edges. Wire-frame modeling techniques, on the other hand, can be used to represent a model as a collection of simple 3D lines, whereas surface modeling can be used to represent a model as a collection of exterior surfaces. CAD modeling using solid modeling techniques is widely used for industrial design and other applications requiring high-quality rendering.

A solid model may be represented by a boundary representation (B-rep), which consists of trimmed parametric surfaces with inter-references that maintain the topology of the model. For example, an edge shared by neighboring faces will have references (sometimes called half-edges or edge-uses) to both faces.

A design engineer is a typical user of a 3D CAD system. The design engineer designs physical and aesthetic aspects of 3D models, and is skilled in 3D modeling techniques. The design engineer creates parts and may assemble the parts into one or more subassemblies and assemblies. During the design process, a high quality rendering of the 3D model is often desired to present the model as a real-world object or to include with the model special effects.

Traditional rendering methods preprocess a model into a tessellation stored in a computer-processing unit (CPU) memory and use the tessellation for rendering. As graphics processing units (GPUs) became common components of CAD systems, interactively rendering solid models involved tessellating the models using a CPU and then transmitting the tessellation to a GPU for further processing.

Often, a design engineer may want to produce a transparent or semi-transparent rendering of a 3D model or parts thereof. This aids the design engineer in visualizing the inside of a model and objects located behind the 3D model or parts thereof. Order Independent Transparency (OIT) provides an improved look to transparency with significantly improved performance, including dynamic performance. Utilizing the OIT technique allows for rendering overlapping semi-transparent objects without having to sort the objects before they are being rendered, and thereby, improves the accuracy and quality of the rendering while also improving the performance.

One of the main problems with existing solutions for semi-transparent rendering of solid models is the amount of time it takes to render a complex model and the appearance of a model. The appearance may not be realistic due to pixel values that are incorrectly calculated. For example, the fragments chosen for the calculation of the pixel value may be the incorrect subset of fragments. A fragment is data (e.g., color and depth) of the object at a location corresponding to a particular pixel location. Since many objects may pass through the same pixel location, many fragments need to be considered when calculating the pixel value. To create a semi-transparent image, those fragments (which may be many), are blended together to calculate a pixel value. Some rendering techniques, however, may not even consider each fragment for a given pixel location, thereby creating an unrealistic appearance.

A blending process is what creates semi-transparent renderings. Blending, a technique known by those skilled in the art, involves using two or more color values as input and outputs a new color value that is a combination of the input color values.

Other rendering techniques use a depth buffer (e.g., a Z-buffer), which do not always work correctly for transparent and semi-transparent renderings, and combinations thereof. This is because for a transparent rendering the fragment furthest from the viewer needs to be rendered first so closer fragments can be blended correctly with those fragments further away. However, in general, a Z-buffer only stores one layer, which is the layer closest to the eye of the viewer.

Depth peeling is another technique known by those skilled in the art. Depth peeling processes many layers and is processor intensive because this technique requires multiple passes, where each pass renders the same pixels again.

Additionally, a drawback of current state-of-the-art rendering techniques includes the existence of undesirable artifacts that misrepresent the 3D model. And in many cases, the wrong set of fragments are chosen and blended into a pixel value. For example, the fragments that contribute to the resulting pixel value are not necessarily fragments closest to the viewer. A system or method that addresses this and other drawbacks would greatly enhance current state-of-the-art computerized systems by allowing the high quality transparent rendering of a 3D model without the undesirable artifacts.

SUMMARY OF THE INVENTION

In general, in one aspect, embodiments of the invention feature a computer-implemented method for rendering a three-dimensional computer-aided design model. The method involves storing in a computer memory a subset of data fragments for a pixel location, and once stored, receiving a next data fragment and determining whether the next data fragment has a depth value that positions the next data fragment closer to a viewer than any one of the data fragments in the subset, in which case, the next data fragment replaces (in the computer memory) the one data fragment in the subset having a farthest depth value, where the farthest depth value indicates a position farthest from the viewer. The method further involves sorting the subset according to a respective depth value of each of the data fragments in the subset, and then executing a blending process to calculate a pixel value representing a transparency characteristic of the three-dimensional model at the pixel location.

Implementations may include, prior to sorting, processing each one of the data fragments for the pixel location to determine which of the data fragments (based upon respective depth values), are positioned closest to the viewer. The data fragments positioned closest to the view are the ones included in the subset. Further, the subset is unordered prior to sorting.

Other implementations may include determining how many data fragments to include in the subset by an empirical method, an analysis of computing resources, a desired rendering quality, dynamically, or any combination thereof. The analysis of computing resources may ascertain an amount of available memory, a processor speed, or any combination thereof. The amount of available memory is with respect to a memory component of a central processing unit (CPU), a graphic processing unit (GPU), or both, and the processor speed is with respect to a processor component of the CPU, the GPU, or both.

Additionally, in implementations the computer memory can be a dedicated multi-layered buffer, the computer-aided model is rendered to appear physically accurate, and the pixel location is processed only once.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The details of one or more embodiments of the invention are set forth in the accompanying drawings and the description that follows. Other features, objects, and advantages of the invention will be apparent from the description and drawings, and from the claims.

DETAILED DESCRIPTION OF THE INVENTION

The present invention provides for high-quality transparent/semi-transparent rendering of a three-dimensional (3D) computer-aided design (CAD) model without introducing undesirable artifacts and while producing a rendering whereby a viewer correctly ascertains which objects are closer and which objects are further away from the viewer. Pixel values are calculated using a subset of fragments that correspond to a specific pixel location, where each fragment is data of a specific object at a location and the data may be, by non-limiting example, a color value and a depth value. The fragments used in the calculation are selected via a sorting process that outputs the n number of fragments closest to the viewer (i.e., having the least amount of depth with respect to the orientation of the 3D model from the viewer).

The present invention utilizes a graphics processing unit (GPU) to determine the pixel values given the fragments that may affect the pixel. A fragment shader (which computes color and other attributes for each pixel) may process pixels in parallel in the GPU. Other processing units may also be utilized, for example, a processing unit that combines the functionality of both a central processing unit (CPU) and GPU. Using implementations of the present invention, high quality transparent/semi-transparent renderings of 3D models that enable a viewer to correctly ascertain the depth of different objects in the 3D model, with respect to the orientation of the 3D model and objects therein, without the presence of artifacts may be achieved at interactive speeds.

Transparency is a quality of an object that allows one to see through the object. Semi-transparency is a quality of an object that allows one to partially see through the object. Hereinafter, semi-transparent and semi-transparency shall include transparent and transparency, respectively.

The present invention introduces a new method for calculating the pixel values for semi-transparent renderings by storing only a subset of fragments for a particular pixel location and only storing those fragments closest to the viewer, that is, the topmost fragments with respect to the viewer. For example, an embodiment may store 8, 9, or 10 fragments instead of 20 fragments. The number of fragments stored may be determined empirically or may depend on the processing resources available in a computing system. Additionally, the number of fragments may be determined dynamically. For example, the present invention can read system information and choose what number of fragments to store depending on available memory, processor performance, or a combination thereof (e.g., the greater the available computer resources, the greater the number of fragments that can be stored). Furthermore, a user may select how many fragments to store dependent upon the desired quality of the rendering.

Moreover, the present invention executes a pre-sorting process to determine the n number of fragments closest to the viewer. By limiting the number of fragments, less memory (e.g., on a video card or GPU) is used, thereby conserving resources, which in turn can be a cost-saving feature of the present invention since less memory needs to be purchased for a system. Additionally, performance may be increased because not as many fragments need to be blended (i.e., used in the calculations of a blending process); and further, the accuracy of the rendering is improved; objects closer to the viewer actually appear to be closer to the viewer.

Additionally, the present invention synchronizes the threads being processed by a GPU (or other processing unit). Since each pixel may be in the process of being computed by one thread, the value of the pixel is protected from being written by that one thread when reading and writing that same pixel to sort the n topmost fragments (i.e., those fragments closest to the viewer) is in process.

Figure 1A:
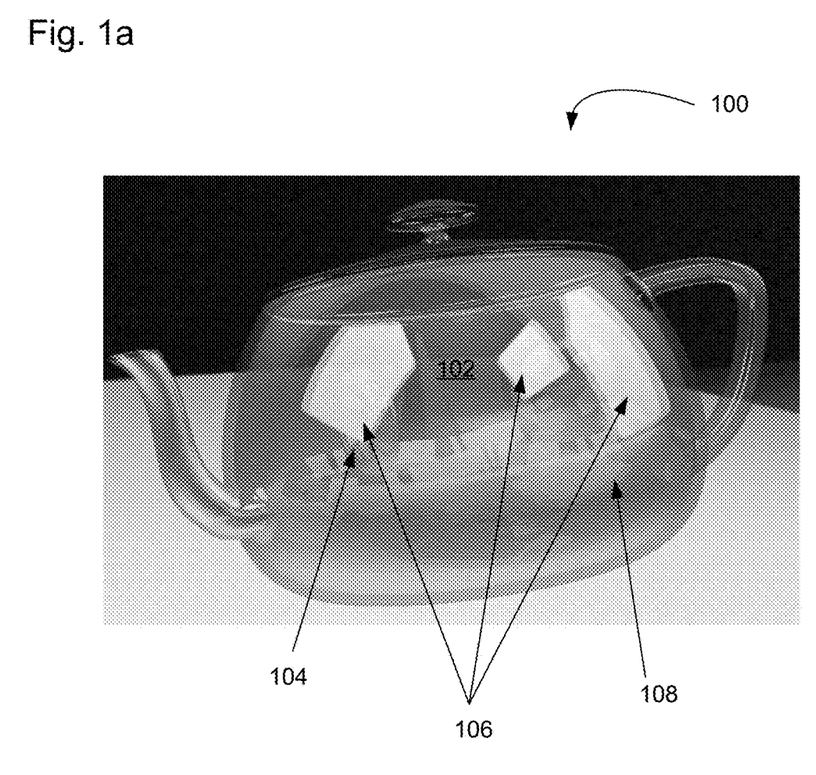
FIG. 1a and FIG. 1b are illustrations of semi-transparent renderings of a 3D CAD model.

Referring now to FIG. 1a, an illustration of a visually correct rendering 100 of a semi-transparent 3D CAD model is shown. The CAD model, a depiction of a teapot 102, has faces that have a semi-transparent attribute (or property). This attribute may be set automatically dependent upon the material of the faces. For example, a semi-transparent attribute of a glass face will cause the glass face to be more transparent than faces comprised of other real-world materials, such as a face having a plastic material property. The outside faces of the teapot have a level of transparency that allows the viewer to see through the teapot and view the objects positioned in the interior of the teapot (e.g., a donut-shaped object 104). The correct rendering 100 contains reflections 106 that are on the outside of the front of the teapot and closer to the viewer than the donut-shaped object 104 inside the teapot. Additionally, a reflection 108 positioned on the back side of the teapot is more faded than other faces since the reflection 108 is further away from the viewer, which may be determined by the depth value of the object defining reflection 108.

Figure 1B:
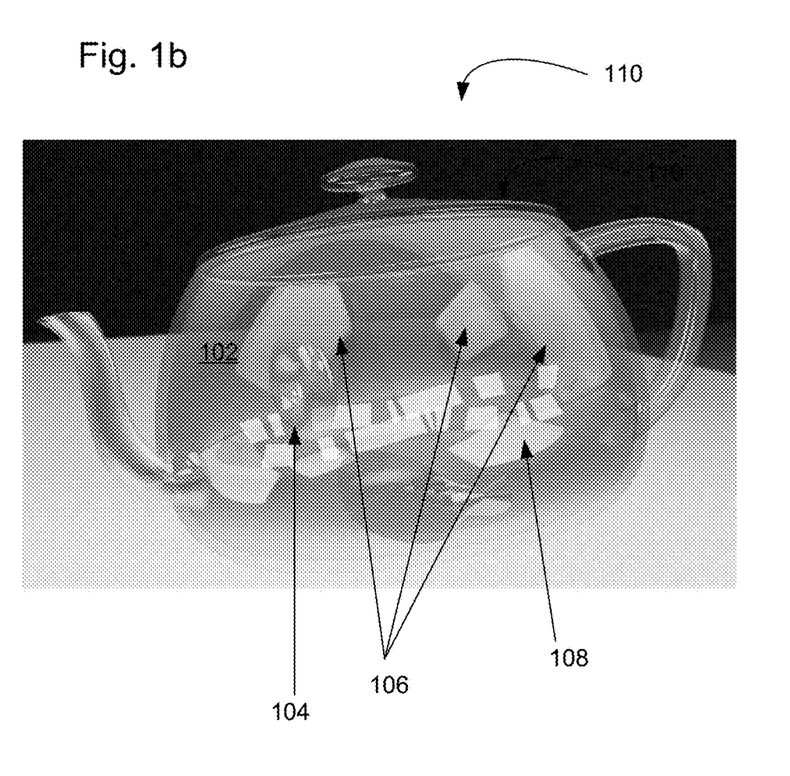

FIG. 1*b*, in contrast, is an illustration of a visually incorrect rendering 110 of a semi-transparent 3D CAD model. The depth at which the donut-shaped object 104 appears to the viewer is incorrect because the donut-shaped object 104 appears to be closer to the viewer than the exterior of the teapot 102 closest to the viewer on which the reflections 106 lay. Additionally, the reflection 108 positioned on the back of the teapot 102 appears incorrectly to be inside or in front of the teapot 102. The fragments chosen and the sorted order of the chosen fragments that produce the correct rendering 100 in FIG. 1*a* result in a more accurate rendering of the teapot 102 than the fragments used to produce the visually incorrect rendering 110 in FIG. 1*b*.

Figure 2A:
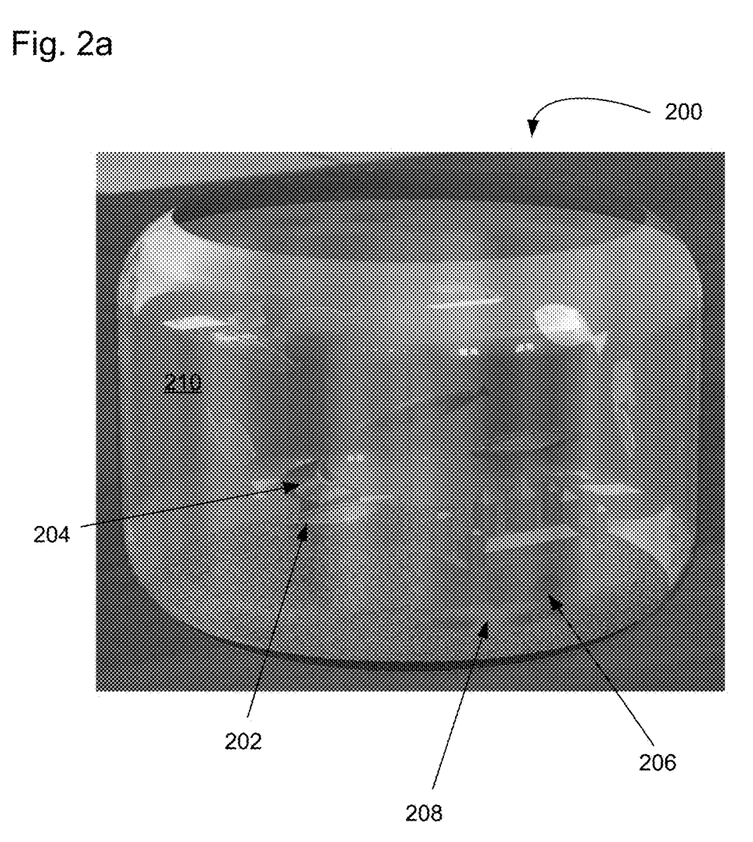
FIG. 2a and FIG. 2b are illustrations of semi-transparent renderings of a 3D CAD model.

Referring now to FIG. 2*a*, a correct rendering of a fishbowl with contents 200 is shown. The green fish 202 is in front of the treasure chest 204. The entrance to the sandcastle 206 is visually correct, with respect to, by non-limiting example, a perspective view of the entrance. Further, a reflection 208 positioned on the front side of the fishbowl 210 is a visually correct special effect.

Figure 2B:
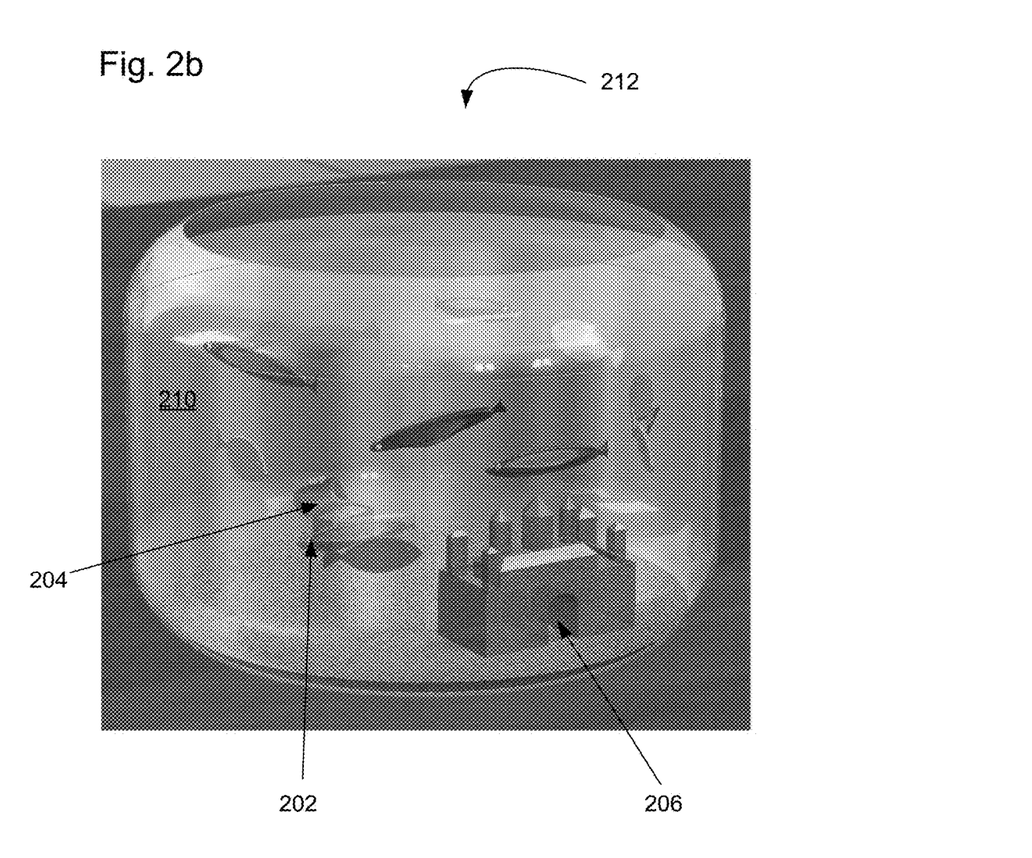

By contrast, FIG. 2*b* illustrates an incorrect rendering of the fishbowl with contents 212. The green fish 202 appears to have a greater transparent quality whereby the green fish 202 is not obscuring enough of the treasure chest 204, as the green fish 202 does in the correct rendering of the fishbowl with contents 200 shown in FIG. 2*a*. Thus, FIG. 2*b* is not as visually accurate or pleasing as FIG. 2*a*. Furthermore, the entrance to the sandcastle 206 is visually incorrect because the area of the sandcastle 206 that overlaps with the entrance is too transparent. Additionally, the reflection 208 visible in FIG. 2*a* is not visible in FIG. 2*b*. The overall quality of the rendering in FIG. 2*a* is much richer (i.e., not as washed out) as FIG. 2*b*, and thus, more accurate. The fragments chosen and the sorted order of the chosen fragments that produce the correct rendering of the fishbowl with contents 200 in FIG. 2*a* result in a more accurate rendering than the incorrect rendering of the fishbowl with contents 212 shown in FIG. 2*b*.

Figure 3:
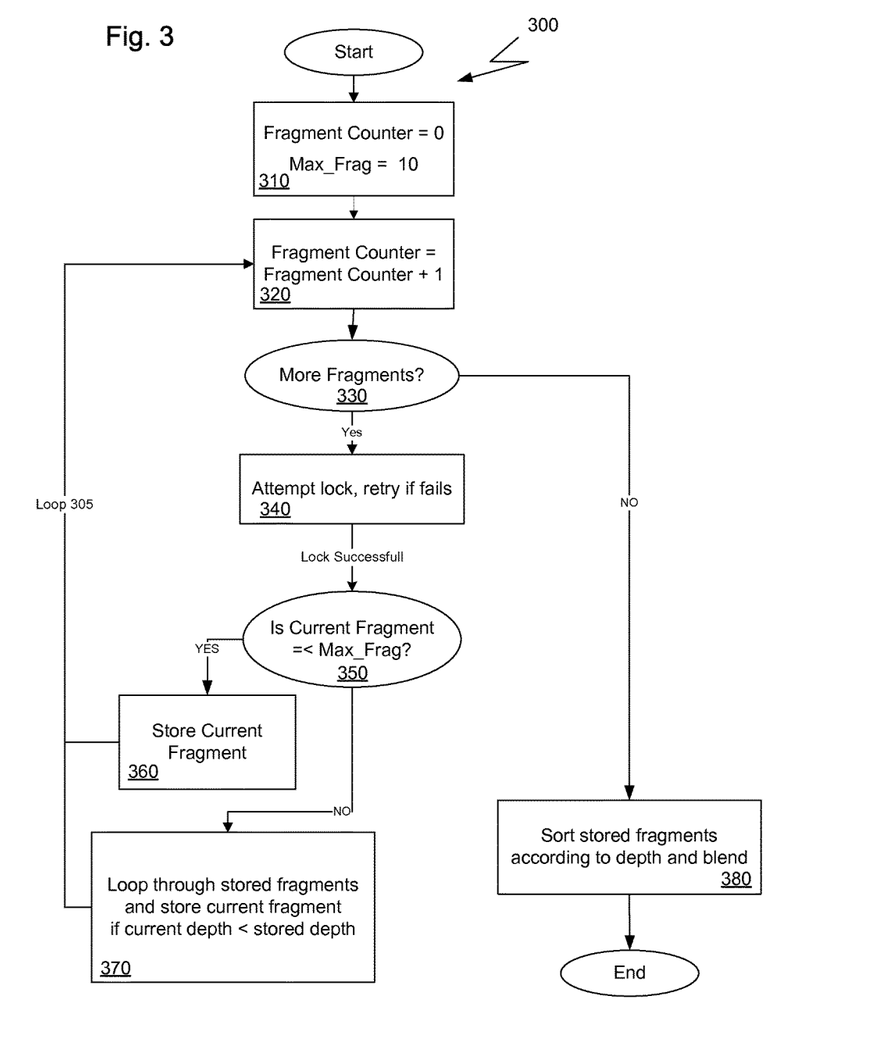
FIG. 3 is an illustration of a process that calculates a pixel value.

Referring now to FIG. 3, a process 300 for computing one pixel value is shown. To begin, the variables named Fragment Counter and Max_Frag are set to a value of 0 and 10, respectively (step 310). In the next step, the Fragment Counter variable is incremented for each loop 305 (step 320). Loop 305 is only executed while the Fragment Counter is less than or equal to the number of fragments n that exist at the one pixel location (step 330). Since multiple threads may be reading pixels and writing to pixels to update the rendering, process 300 locks out any threads from doing so to prevent a pixel location from being written while a new pixel value is being calculated. Thus, process 300 attempts to lock a pixel and does not continue to the next step until the pixel is locked (step 340).

The maximum number of fragments (i.e., Max_Frag in FIG. 3), is a number that may be chosen after determining acceptable rendering results and performance, as previously discussed. The greater the number of fragments, the more processing and memory that is necessary for rendering, and thus, processing fewer fragments increases performance with respect to speed. However, performance degradation may not be as noticeable if powerful multi-processor units (e.g., single or multi-processor CPUs, GPUs, or a combination thereof) are executing the process 300. The actual value of Max_Frag may be determined empirically and/or may be dependent on the hardware system executing the present invention. As illustrated, Max_Frag is set to 10 (step 310) and so long as the Fragment Counter is less than or equal to 10 (tested in step 350), the current fragment will be stored in a buffer (step 360), for example, an A-buffer, which is an allocated memory area in a GPU for general purpose usage.

Once the maximum number of fragments are stored, the buffer is considered full and process 300 reads the stored fragments and only keeps the maximum number of fragments that are closest to the viewer (step 370). In the last step, executed after all the fragments at the one pixel location are determined to be one of the maximum number of fragments closest to the viewer (i.e., fragment counter=n+1—there are no more fragments), all the stored fragments are sorted according to their depth and blended (380).

Process 300 may be executed for every pixel or every pixel that will have a value associated with the model. Pixels that will only contain values for background colors need not be processed. Furthermore, multi-processing units (e.g., GPUs) can process all the pixels simultaneously (i.e., execute process 300 simultaneously for all pixels).

Figure 4:
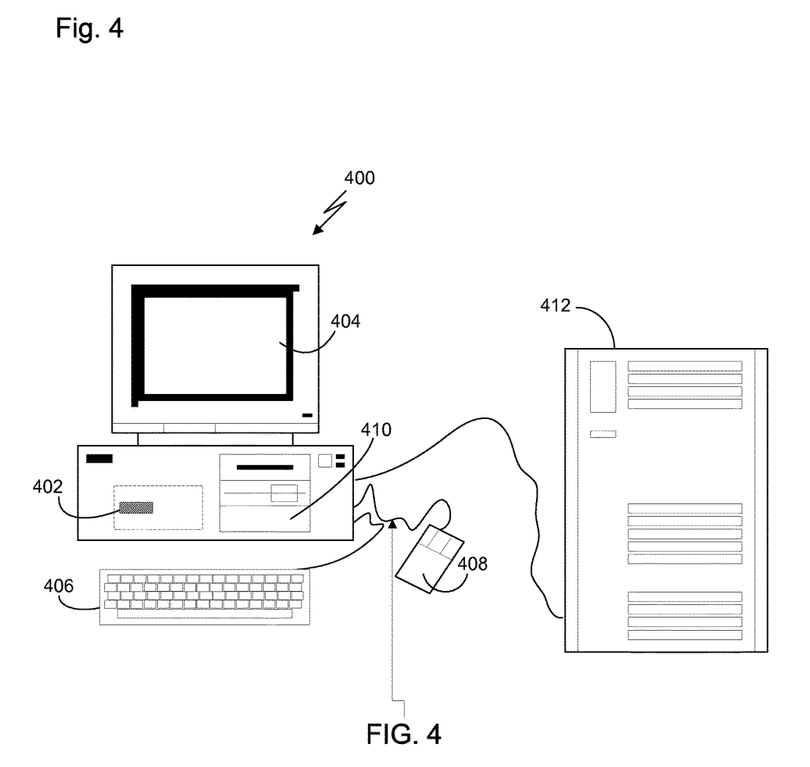
FIG. 4 is a schematic diagram of a computer system in which embodiments of the present invention are implemented.

Referring now to FIG. 4, a computerized modeling system 400 is shown and includes a CPU 402, a computer monitor 404, a keyboard input device 406, a mouse input device 408, and a storage device 410. The CPU 402, computer monitor 404, keyboard 406, mouse 408, and storage device 410 can include commonly available computer hardware devices. For example, the CPU 402 can include an Intel processor. The mouse 408 may have conventional left and right buttons that the user may press to issue a command to a software program being executed by the CPU 402. As an alternative or in addition to the mouse 408, the computerized modeling system 400 can include a pointing device such as a trackball, touch-sensitive pad, or pointing device and buttons built into the keyboard 406. Those of ordinary skill in the art appreciate that the same results described herein with reference to a mouse device can be achieved using another available pointing device or technology. Other appropriate computer hardware platforms are suitable as will become apparent from the discussion that follows. Such computer hardware platforms are preferably capable of operating the Microsoft® Windows® 7, UNIX®, Linux, or Mac OS® operating systems.

Additional computer processing units and hardware devices (e.g., graphic processing units (GPUs), rapid prototyping, video, and printer devices) may be included in the computerized modeling system 400. Furthermore, the computerized modeling system 400 may include network hardware and software thereby enabling wired or wireless communication to a hardware platform 412, and facilitating communication between numerous computer systems that may include a CPU and a storage system, among other computer components.

Computer-aided modeling software may be stored on the storage device 410 and loaded into and executed by the CPU 402. The modeling software allows a user to create and modify a 3D model, and implements aspects of the invention described herein. The CPU 402 uses the computer monitor 404 to display a 3D model and other aspects thereof as described. Using the keyboard 406 and the mouse 408, the user can enter and modify data associated with the 3D model. The CPU 402 accepts and processes input from the keyboard 406 and mouse 408. The CPU 402 processes the input along with the data associated with the 3D model and makes corresponding and appropriate changes to that which is displayed on the computer monitor 404 as commanded by the modeling software. In one embodiment, the modeling software is based on a solid modeling system that may be used to construct a 3D model consisting of one or more solid and surface bodies.

The invention may be implemented in digital electronic circuitry, or in computer hardware, firmware, software, or in combinations thereof. Apparatus of the invention may be implemented in a computer program product tangibly embodied in a machine-readable non-transitory storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. An embodiment of the present invention may also use the OpenGL and the GLSL shading language. Suitable processors include, by way of non-limiting example, both general and special purpose microprocessors. Generally, a processor will receive instructions and data from a read-only memory and/or a random access memory. Storage devices suitable for tangibly embodying computer program instructions and data are non-transient and include all forms of non-volatile memory, including by way of example semiconductor memory devices, such as EPROM, EEPROM, and flash memory devices; magnetic disks such as internal hard disks and removable disks; magneto-optical disks; CD-ROM disks; and DVD-ROM disks. Any of the foregoing may be supplemented by, or incorporated in, custom-designed ASICs (application-specific integrated circuits).

High quality rendering of semi-transparent objects in the manner described herein not only realizes time-saving advantages. Other advantages include producing a correct visualization of the depth of objects. Additionally, the present invention prevents pixels from being updated when a new value for the pixel is being calculated. Moreover, the present invention uses less computing resources (e.g., processor and memory resources), than other techniques used for semi-transparent rendering, and therefore, is faster than other techniques. Using the present invention, test results have shown up to one-third less memory resources may be used, thereby allowing quality rendering of semi-transparent object practical for state-of-the art applications. In addition, the present invention solves an accuracy issue; regardless of using even more memory, the result with previous rendering techniques was not guaranteed to be 100% accurate.

Thus, an important advantage of the present invention is that special effects for display models on a computer graphics device can become more mainstream, that is, more widely available and useable to more users. CAD modeling using solid modeling techniques is widely used in the fields of engineering, industrial design, and entertainment, all of which could benefit from implementations of the present invention.

This invention has been particularly shown and described with references to example embodiments thereof. Nevertheless, it will be understood by those skilled in the art that various modifications in form and details may be made without departing from the scope of the invention encompassed by the appended claims. For example, in step 370, the current fragment may be stored if the current fragment's depth is not only less than the stored depth (i.e., closer to the viewer), but also equal to the stored depth. As another example, implementations may change the order in which operations are performed. Furthermore, depending on the needs of an implementation, particular operations described herein may be implemented as a combined operation, eliminated, added to, or otherwise rearranged.

What is claimed is:

1. A computer-implemented method for rendering a three-dimensional computer-aided design model, the method comprising:

from a plurality of data fragments for a certain pixel location of a three-dimensional computer aided design (CAD) model, storing in a computer memory an unordered subset of the plurality of data fragments for the certain pixel location of the three-dimensional computer aided design (CAD) model, the subset being for the data fragments closest to a viewer;

once the subset is stored, receiving a next data fragment having a depth value representative of position of the next data fragment, and determining from the depth value whether the next data fragment is closer to the viewer than at least one of the data fragments in the stored unordered subset;

if the depth value positions the next data fragment closer to the viewer than at least one of the data fragments in the stored unordered subset, replacing in the computer memory the one data fragment in the subset having a farthest position according to depth value with the next data fragment, wherein the farthest position according to depth value indicates a position farthest from the viewer, and wherein said replacing resulting in the stored unordered subset having a number of data fragments closest to the viewer;

sorting the data fragments of the resulting stored unordered subset according to a respective depth value of each of the data fragments in the subset; and performing a blending process that uses the sorted data fragments of the subset to compute a pixel value representing a transparency characteristic of the three-dimensional CAD model at the certain pixel location.

2. The computer-implemented method of claim 1, further comprising prior to sorting, processing each one of the plurality of data fragments for the certain pixel location to determine which of the plurality of data fragments based upon respective depth values are positioned closest to the viewer, wherein the data fragments positioned closest to the viewer are included in the subset.

3. The computer-implemented method of claim 1, further comprising preventing the certain pixel location from being written to when the blending process is computing the pixel value.

4. The computer-implemented method of claim 1, wherein the number of data fragments included in the subset is determined by: an empirical method, an analysis of computing resources, a desired rendering quality, or any combination thereof; and
the analysis of computing resources analyzes: (i) the computing resources available upon system installation, (ii) the computing resources currently available, or (iii) any combination thereof.

5. The computer-implemented method of claim 4, wherein:
the analysis of computing resources ascertains an amount of available memory and/or a processor speed;
the amount of available memory is with respect to a memory component of a central processing unit and/or a graphic processing unit; and
the processor speed is with respect to a processor component of the central processing unit and/or the graphic processing unit.

6. The computer-implemented method of claim 1, wherein the computer memory is a dedicated multi-layered buffer.

7. The computer-implemented method of claim 1, further comprising the three-dimensional CAD model being rendered to appear physically accurate.

8. The computer-implemented method of claim 1, wherein the certain pixel location is processed only once to complete a full rendering of the three-dimensional CAD model.

9. A non-transitory computer-readable data storage medium comprising instructions for causing a computer to:
from a plurality of data fragments for a certain pixel location on a computer monitor, store in a computer memory an unordered subset of the plurality of data fragments for the certain pixel location, the data fragments being of a three-dimensional computer-aided design model, and the subset being for the data fragments closest to a viewer;
once the subset is stored, receive a next data fragment, the received next data fragment having a depth value indicative of position of the next data fragment;
determine whether the depth value of the next data fragment positions the next data fragment closer to the viewer than at least one of the data fragments in the stored unordered subset;
if the depth value positions the next data fragment closer to the viewer than at least one of the data fragments in the stored unordered subset, replace in the computer memory the one data fragment in the stored unordered subset having a farthest position according to depth value with the next data fragment, wherein the farthest position according to depth value indicates a position farthest from the viewer, and wherein said replacing resulting in the stored unordered subset having a number of data fragments closest to the viewer;
sort the data fragments of the resulting stored unordered subset according to a respective depth value of each of the data fragments in the subset; and
execute a blending process that uses the sorted data fragments of the subset to compute a pixel value representing a transparency characteristic of the three-dimensional computer-aided design model at the certain pixel location.

10. The computer-readable data storage of claim 9, further comprising instructions for causing a computer to, prior to sorting, process each one of the plurality of data fragments for the certain pixel location to determine which of the plurality of data fragments based upon respective depth values are positioned closest to the viewer, wherein the data fragments positioned closest to the viewer are included in the subset.

11. The computer-readable data storage of claim 9, further comprising instructions causing the computer to prevent the certain pixel location from being written to during the blending process computing the pixel value.

12. The computer-readable data storage of claim 9, further comprising instructions for causing a computer to:
process the certain pixel location only once; and
render the three-dimensional computer-aided design model to appear physically accurate.

13. The computer-readable data storage of claim 9, wherein:
the number of data fragments included in the subset is determined by: an empirical method, an analysis of computing resources, a desired rendering quality, or any combination thereof;
the analysis of computing resources analyzes: (i) the computing resources available upon system installation, (ii) the computing resources currently available, or (iii) any combination thereof;
the analysis of computing resources ascertains an amount of available memory and/or a processor speed;
the amount of available memory is with respect to a memory component of a central processing unit and/or a graphic processing unit; and
the processor speed is with respect to a processor component of the central processing unit and/or the graphic processing unit.

14. The computer-readable data storage of claim 9, wherein the computer memory is a dedicated multi-layered buffer.

15. A computer-aided design system, comprising:
a central processing unit (CPU) operatively coupled to a data storage system, the data storage system storing a three-dimensional computer-aided design (CAD) model; and
a data storage memory operatively coupled to the CPU and comprising instructions to configure the CPU to:
from a plurality of data fragments for a certain pixel location on a computer monitor, store in a computer memory an unordered subset of the plurality of data fragments for the certain pixel location, the data fragments being of the three-dimensional CAD model, and the subset being for the data fragments closest to a viewer;
once the subset is stored, receive a next data fragment having a depth value representative of position of the next data fragment;
determine whether the depth value of the next data fragment positions the next data fragment closer to the viewer than at least one of the data fragments in the stored unordered subset;
if the depth value positions the next data fragment closer to the viewer than at least one of the data fragments in the stored unordered subset, replace in the computer memory the one data fragment in the subset having a farthest position according to depth value with the next data fragment, wherein the farthest position according to depth value indicates a position farthest from the viewer, and wherein said replacing resulting in the stored unordered subset having a number of data fragments closest to the viewer;

sort the data fragments of the resulting stored unordered subset according to a respective depth value of each of the data fragments in the subset; and execute a blending process that uses the sorted data fragments of the subset to compute a pixel value representing a transparency characteristic of the three-dimensional CAD model at the certain pixel location.

16. The computer-aided design system of claim 15, further comprising instructions to configure the CPU to, prior to sorting, process each one of the plurality of data fragments for the certain pixel location to determine which of the plurality of data fragments based upon respective depth values are positioned closest to the viewer, wherein the data fragments positioned closest to the viewer are included in the subset.

17. The computer-aided design system of claim 15, wherein the CPU further prevents pixel update of the certain pixel location when the blending process is computing the pixel value.

18. The computer-aided design system of claim 15, further comprising instructions to configure the CPU to:

process the certain pixel location only once; and render the three-dimensional CAD model to appear physically accurate.

19. The computer-aided design system of claim 15, wherein:

the number of data fragments included in the subset is determined by: an empirical method, an analysis of computing resources, or a desired rendering quality, or (iii) any combination thereof;

the analysis of computing resources analyzes: (i) the computing resources available upon system installation, (ii) the computing resources currently available, or any combination thereof;

the analysis of computing resources ascertains an amount of available memory and/or a processor speed;

the amount of available memory is with respect to a memory component of a central processing unit and/or a graphic processing unit; and the processor speed is with respect to a processor component of the central processing unit and/or the graphic processing unit.

20. The computer-aided design system of claim 15, wherein the computer memory is a dedicated multi-layered buffer.

\* \* \* \* \*